Jan. 24, 1939. J. S. NORTON 2,144,635
FISHING REEL
Filed June 19, 1937
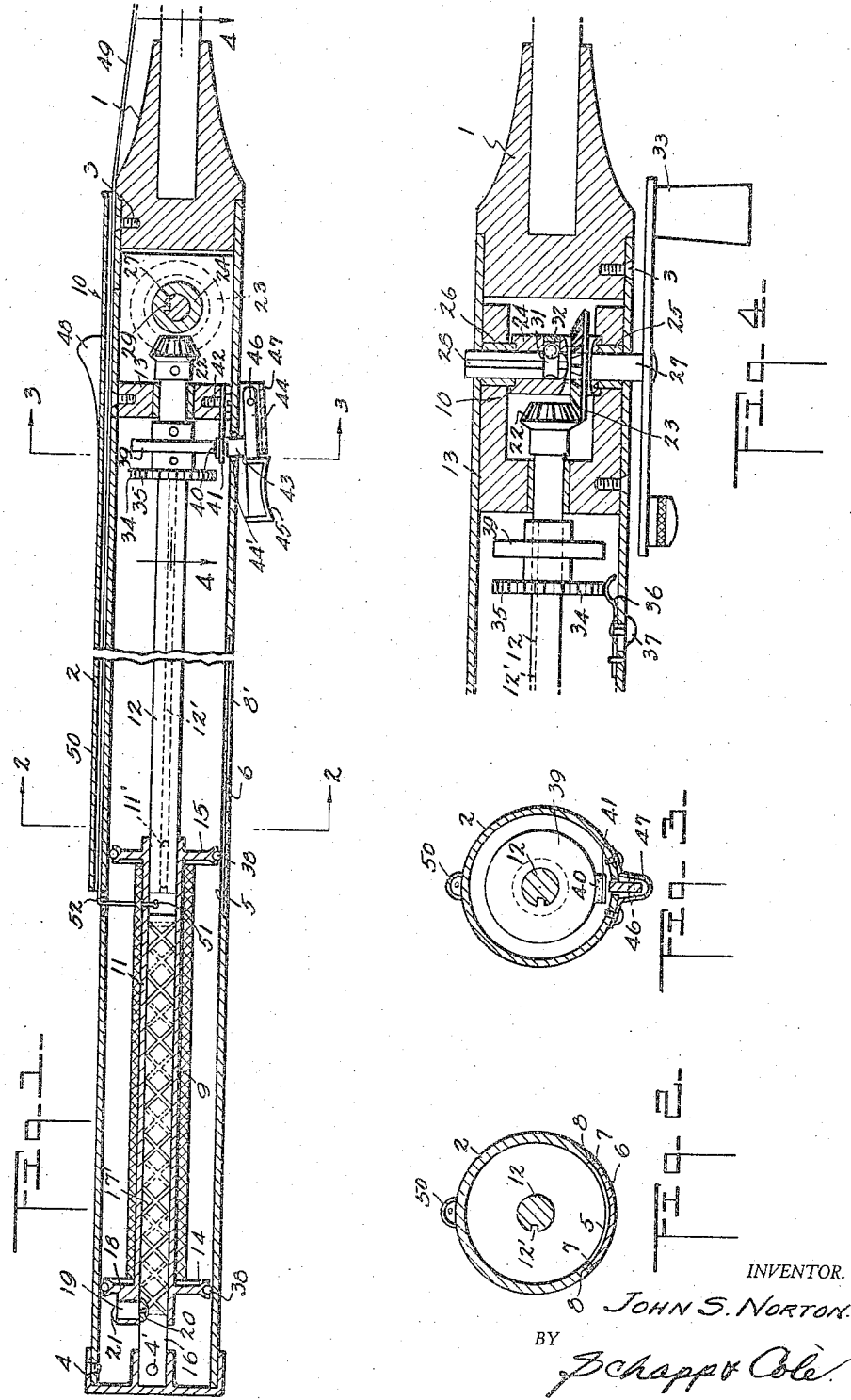
INVENTOR.
JOHN S. NORTON.
BY
Schapp & Cole
ATTORNEYS.

Patented Jan. 24, 1939

2,144,635

UNITED STATES PATENT OFFICE 2,144,635

FISHING REEL

John S. Norton, San Francisco, Calif.

Application June 19, 1937, Serial No. 149,144

6 Claims. (Cl. 43—20)

The present invention relates generally to a fishing reel, and has as its principal object the provision of a device of the character described, which is an improvement over the forms shown in my United States Letters Patent, No. 1,955,973, granted April 24, 1934.

In my prior patent, I disclose a fishing reel that is adapted for accommodation within the handle or manipulating end of a fishing pole. The spool for the line is illustrated in the patent as being fitted into a tubular handle, and upon turning the spool the latter is made to travel axially in order to feed the line thereon from a fixed point.

The improvements in the present invention have particular reference to the brake mechanism and the ratchet-drag, both of which are adapted for controlling the rotary and axial movements of the spool. The operating means therefor is arranged in such a manner that brake and ratchet-drag may be operated with facility and ease.

As a further object of my invention, I propose to provide a slide plate in the tubular handle to allow the interior mechanism to be inspected and regulated, and at the same time the spool is given a substantial bearing surface for its rotary and axial movements.

Other objects and advantages of my invention will appear as the specification proceeds and the novel features thereof will be particularly pointed out in the annexed claims.

For a better understanding of my invention, reference should be had to the accompanying drawing, forming part of this application, in which:

Figure 1 shows an axial section through the end of a fishing pole having my reel mechanism provided therein, parts being shown in elevation;

Figures 2 and 3 are transverse sectional views taken along the lines 2—2 and 3—3, respectively of Figure 1, and Figure 4 an enlarged view taken along line 4—4 of Figure 1.

While I have shown only the preferred form of my invention I wish to have it understood that various changes or modifications may be made within the scope of the claims hereto attached without departing from the spirit of the invention.

The fishing pole 1, which is indicated only fragmentarily in the drawing, terminates at its rear end in a hollow housing 2, preferably cylindrical in form and corresponding in diameter to the diameter of the adjacent end of the pole as shown in Figure 1. This housing may be secured at the end of the pole by means of screws as indicated at 3, while the rear end of the housing may be closed by a cap 4.

It will be understood that this housing really forms part of the pole and may be referred to as the hollow manipulating end of the pole. Access to the housing may be gained through an opening indicated at 5, which may be closed by means of a slide plate 6. The side edges of the plate 6 are bevelled as at 7 and are slidably disposed in confronting V-shaped grooves 8 formed in the housing 2. The slide plate is sprung into the grooves, and it will be noted that a recess 8' is provided for receiving the plate when the latter is moved endwise for uncovering the opening 5.

The reel mechanism accommodated within the hollow end of the pole comprises in its principal features a spool 9 and an actuating mechanism 10 for the spool mounted forwardly of the latter. The spool itself has a sleeve 11, which is slidably mounted on a shaft 12, the latter being supported in a bearing 13.

The sleeve 11 of the spool has two flanges 14 and 15 projecting therefrom in spaced relation. The sleeve of the spool is slidably mounted upon the shaft 12, but is held against rotation with respect thereto by means of a key 11' riding in a keyway 12' formed in the shaft.

The spool is movable over a stem 16 projecting axially in the sleeve 11, one end of the stem being fixed to the cap 4 by a pin 4'. The stem 16 is provided with an endless thread 17'. The sleeve itself has a block 18 formed integrally therewith, and a plug 19 is revolvably disposed within this block, and has a pin 20 projecting into the endless thread.

The plug is free to turn to allow of change in direction of the pin 20 at the end of each forward or rearward movement, and the plug is held in place by a set-screw 21.

The forward end of the shaft 12 terminates in a pinion 22, which is in mesh with a bevel gear 23. The latter has a sleeve 24 fixed thereto, which is rotatably supported in bearings 25 and 26. A shaft 27 is grooved longitudinally at 28 to receive a key 29 formed on the inner bore of the sleeve 24.

The shaft 27 has a circumferential groove 31, which is engaged by a spring-pressed ball 32 so as to hold the shaft in either one of two positions. When the shaft is in the position shown in Figure 4, the crank 33, which is fixed to the shaft, is disposed on the right-hand side of the housing 2.

If the shaft 27 is reversed so as to enter from the opposite side, the crank is disposed on the left-hand side and the fishing pole may be used by a left handed operator. In both instances, the ball 32 enters the annular groove and holds the shaft 27 against accidental lateral movement.

The shaft 12 has a ratchet-drag disc 34 fixed thereto, which is provided with a corrugated periphery 35. A leaf spring 36 (see Figure 4), may be actuated by a slidable button 37 for pressing the leaf spring against the disc 34 to retard the rotary motion of the latter and of the shaft 12.

The flanges 14 and 15 of the spool 9 are provided with ball bearings 38 around their peripheries, which ride on the inner surface of the cylindrical housing 2. In this way the spool 9 is supported against transverse movement from an axial line.

The shaft 12 is also provided with a brake disc 39, which is fixed thereto immediately in the rear of the bearing 13. A brake shoe 40 is carried by a leaf spring 41 and is adapted for applying a braking action to the disc 39. The leaf-spring 41 is anchored to the bearing 13 by means of a screw 42 (see Figure 1), and may be flexed by a detent 43 projecting from a lever 44 through an opening 44' in the housing 2.

It will be noted that the lever 44 extends lengthwise of the housing 2, and that a finger-receiving recess 45 is provided at the rear of the lever. The front end of the lever is pivoted at 46 in a bracket 47 extending from the housing 2. A thumb rest 48 is provided on the housing 2 opposite the finger-operated brake lever.

A line 49 is accommodated in its rear portion in a small elongated housing 50, and one end of the line is fastened to the spool as shown at 51. The line passes through an opening 52 fashioned in the wall of the housing.

The operation of the device is as follows: To wind the line it is only necessary to turn the crank 33. This causes the shaft 12 to rotate and the rotary motion is transmitted to the spool 9, which latter is made to travel back and forth due to engagement of the pin 20 with the endless thread on the stem 16.

As the spool revolves and passes back and forth, the line 49 is fed through the opening 52 and is wound upon the spool in layers. If a bite has been obtained, the brake may be worked by pressing on the lever 44 for opposing the pull of the fish. The ratchet-drag may be used as desired by merely sliding the button 37 until the leaf-spring 36 engages with the disc 34.

It will be noted that the ratchet-drag disc 34 and the brake disc 39 are both mounted adjacent the bearing 13, and that any tendency of the shaft 12 to move laterally is opposed by the ball bearings 38, which ride on the inner face of the tubular housing.

I claim:

1. In a fishing apparatus, a fishing pole having a hollow manipulating end, a shaft mounted axially in said end, a spool disposed on the shaft and operated thereby, a brake disc secured to the shaft, a brake shoe arranged for bearing against the rim of the disc, and a lever hinged to the manipulating end of the pole to extend lengthwise thereof and being movable to press the shoe against the disc.

2. In a fishing apparatus, a fishing pole having a hollow manipulating end, a shaft mounted axially in said end, a spool disposed on the shaft and operated thereby, a brake disc secured to the shaft, a brake shoe arranged for bearing against the rim of the disc, a lever hinged to the exterior of the manipulating end of the pole to extend lengthwise thereof, and a detent on the lever projecting through an opening in said end and positioned to press the shoe against the disc when the lever is actuated.

3. In a fishing apparatus, a fishing pole having a hollow manipulating end, a shaft mounted axially in said end, a bearing block for supporting the shaft, a spool disposed on the shaft and operated thereby, a brake disc secured to the shaft, a leaf spring anchored to the bearing block and extending over the rim of the disc, a brake shoe carried by the leaf spring for bearing against the rim of the disc, and means for flexing the leaf spring for pressing the shoe against the disc.

4. In a fishing apparatus, a fishing pole having a hollow manipulating end, a shaft mounted axially in said end, a bearing block for supporting the shaft, a spool disposed on the shaft and operated thereby, a brake disc secured to the shaft immediately adjacent the bearing block and interposed between the spool and the block, and a brake arranged to bear against the rim of the disc, the spool having flanges riding on the inner surface of the hollow manipulating end of the pole to resist lateral movement of the shaft when the brake is applied.

5. In a fishing apparatus, a fishing pole having a hollow manipulating end, a shaft mounted axially in said end, a bearing block for supporting the shaft, a spool disposed on the shaft and operated thereby, a brake disc secured to the shaft immediately adjacent the bearing block and interposed between the spool and the bearing block, a leaf spring anchored to the bearing block and extending over the rim of the disc, a brake shoe carried by the leaf spring for bearing against the rim of the disc, and a lever extending lengthwise of the pole for flexing the leaf spring to press the shoe against the disc.

6. In a fishing apparatus, a fishing pole having a hollow manipulating end, a shaft mounted axially in said end, a bearing block for supporting the shaft, a spool disposed on the shaft and operated thereby, a brake disc secured to the shaft immediately adjacent the bearing block and interposed between the spool and the bearing block, a leaf spring anchored to the bearing block and extending over the rim of the disc, a brake shoe carried by the leaf spring for bearing against the rim of the disc, and a lever extending lengthwise of the pole for flexing the leaf spring to press the shoe against the disc, the spool having flanges riding on the inner surface of the hollow manipulating end of the pole to resist lateral movement of the shaft when the brake is applied.

JOHN S. NORTON.